United States Patent [19]

Kilper

[11] Patent Number: 5,048,660
[45] Date of Patent: Sep. 17, 1991

[54] CONTROLLED FLOW GRAVITY CONVEYOR

[75] Inventor: John J. Kilper, St. Louis County, Mo.

[73] Assignee: Alvey, Inc., St. Louis County, Mo.

[21] Appl. No.: 430,307

[22] Filed: Nov. 2, 1989

[51] Int. Cl.⁵ ............................................. B65G 13/00
[52] U.S. Cl. .................................................. 193/35 A
[58] Field of Search .................... 414/276, 529, 536; 198/781, 789; 193/35 A

[56] References Cited

U.S. PATENT DOCUMENTS

| | | | |
|---|---|---|---|
| 3,108,671 | 10/1963 | Fuka et al. ...................... | 193/40 X |
| 3,627,092 | 12/1971 | Fleischauer et al. ............ | 198/781 X |
| 4,253,558 | 3/1981 | Roeing et al. .................... | 193/35 A |
| 4,383,598 | 5/1983 | Newman .......................... | 193/35 A |

Primary Examiner—Joseph E. Valenza
Assistant Examiner—Keith L. Dixon
Attorney, Agent, or Firm—Gravely, Lieder & Woodruff

[57] ABSTRACT

The invention herein is concerned with not only limiting the velocity of packages on a downwardly inclined conveyor trackway, but effecting a cyclically operable system of brake assemblies that not only brake the flow of packages down the trackway but effect reversal of groups of rollers in the trackway for short periods of time so that gaps are created between packages as they accumulate at the end of the trackway so that the pressure between packages is redudced so as not to damage the contents. The brake assemblies are distributed in adjacent series along the trackway and operate in association with different groups of rollers and in timed cycles so that packages are prevented from developing a free or unretarded flow under gravity influence.

11 Claims, 4 Drawing Sheets

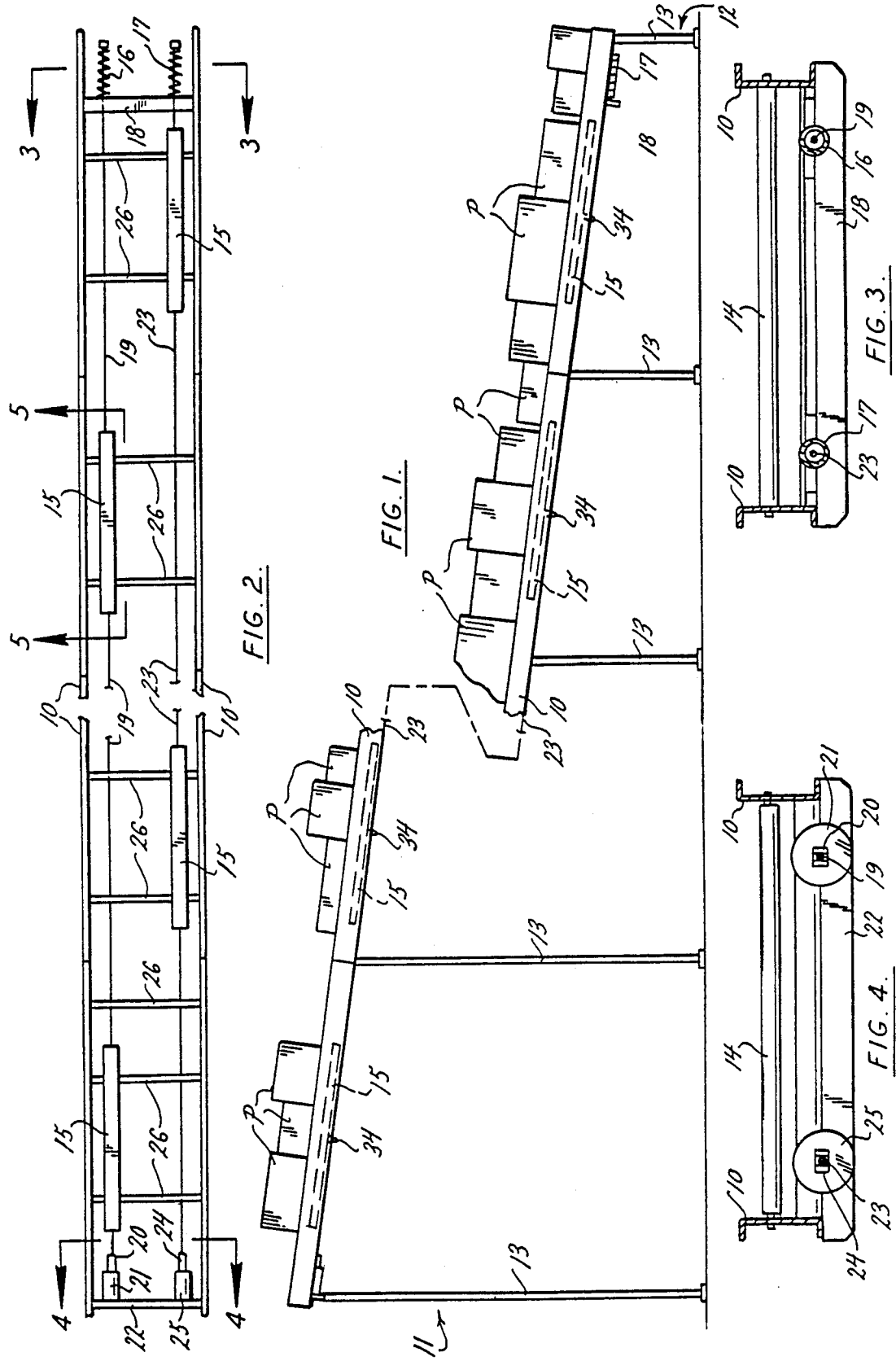

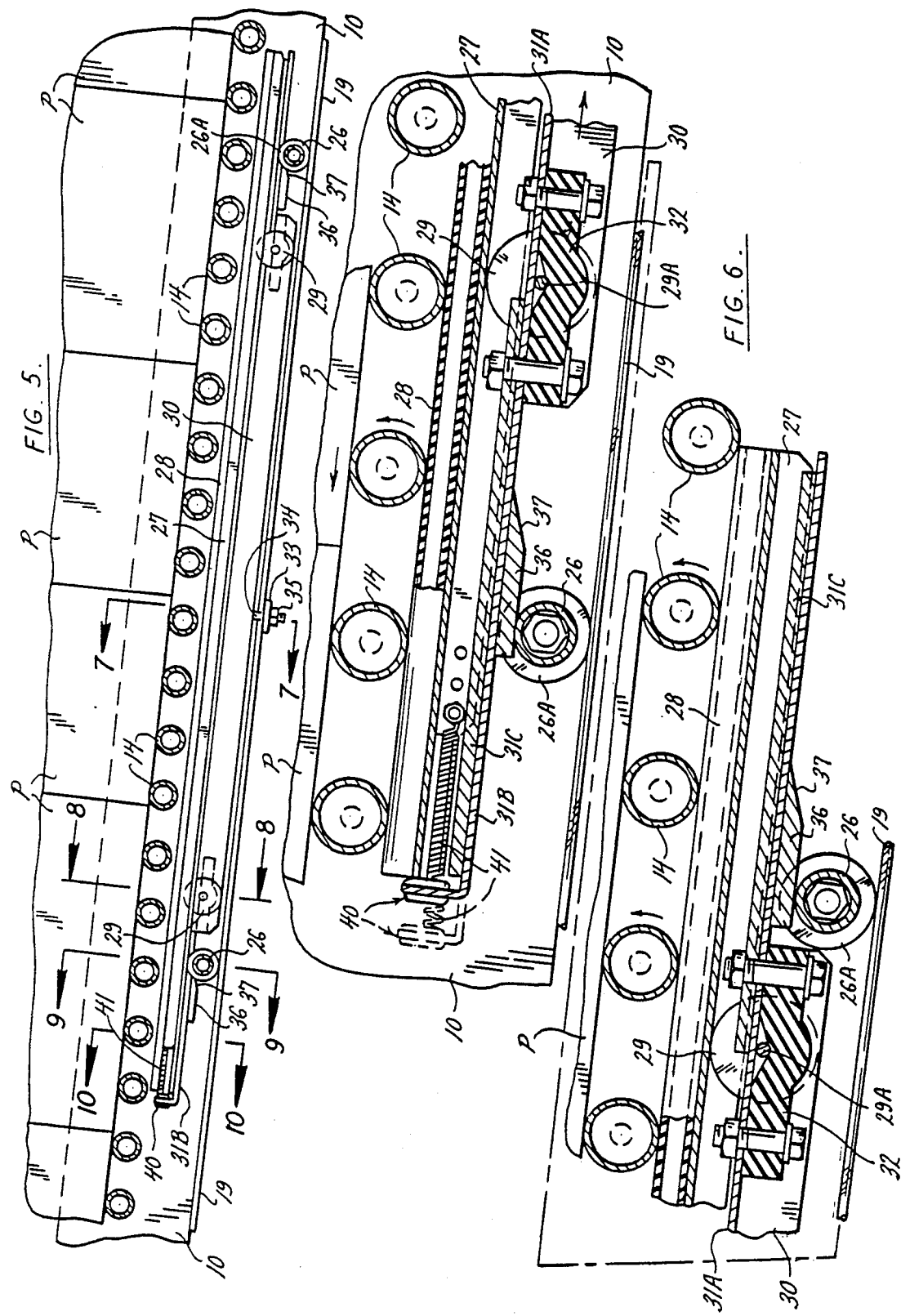

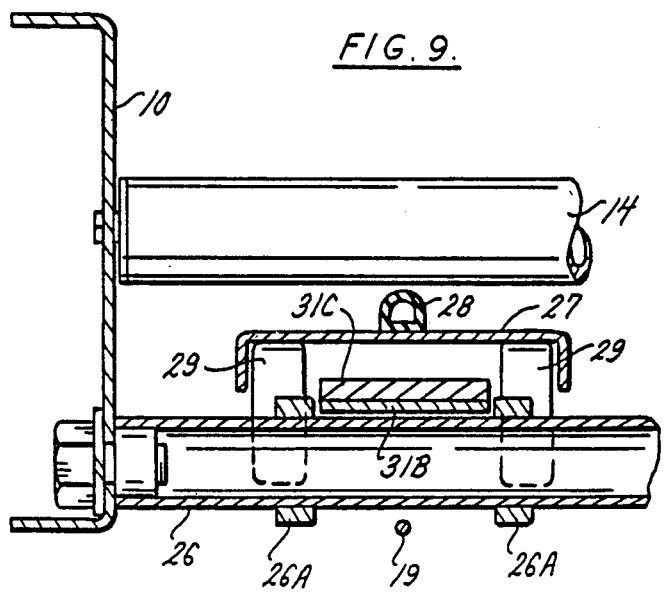
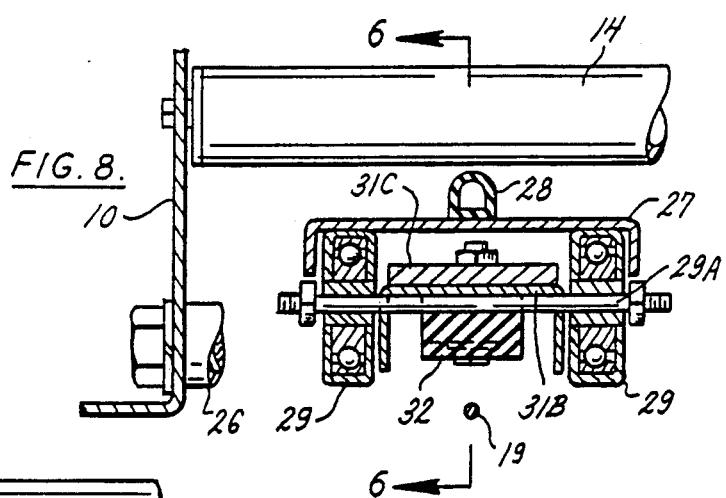
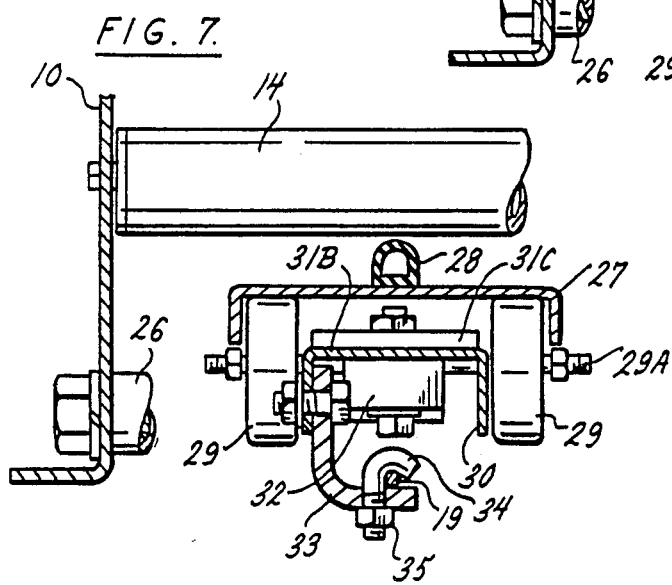
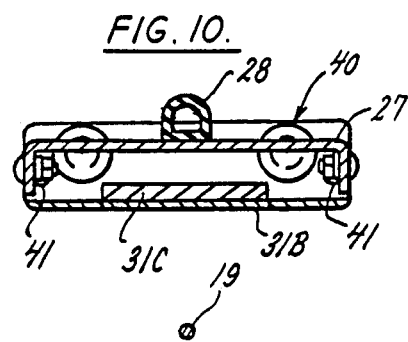

CONTROLLED FLOW GRAVITY CONVEYOR

BACKGROUND OF THE INVENTION

1. Field of the Invention

The present invention is directed to improvements in controlled flow gravity conveyors for packages of various sizes and weights.

2. Description of the Prior Art

Numerous concepts have been employed to limit the speed, impact, and line pressure produced by cartons being transported on sloped gravity conveyors. One example is found in the patent to Fuka et al. U.S. Pat. No. 3,108,671 of Oct. 29, 1963. In many cases powered conveyors have been used for the simple purpose of controlling the speed of the packages even on inclined conveyors, and such an example is seen in Fleischauer et al U.S. Pat. No. 3,610,406 of Oct. 5, 1971; U.S. Pat. No. 3,621,982 of Nov. 23, 1971; U.S. Pat. Nos. 3,627,091 and 3,627,092 of Dec. 14, 1971. A further example of a conveyor provided with roller brake devices is seen in Kurger et al U.S. Pat. No. 3,756,476 of Sept. 4, 1973. While some success has been achieved in limiting velocity and impact, the pressure build-up resulting from stacking cartons back-to-back is damaging to the cartons and the products contained therein, and subjects the workers who may be required to remove cartons from the conveyor to forces which may be beyond their physical capability. Designs which employ carton sensors and brakes limit pressure until gaps between cartons are closed, at which time full line pressure is produced.

BRIEF SUMMARY OF THE INVENTION

It is an important object of the present invention to use brake devices to control package velocity by periodically actuating the brake devices so as to contact with rollers supporting packages in an inclined conveyor to rotate the rollers in a direction opposite to package flow so that the reverse motion of the rollers creates gaps between the accumulating packages, thereby reducing the pressure between packages at the end of the conveyor line.

Further objects of the present invention are directed to utilizing rollers with a high friction surface material to improve the ability of the rollers to reverse the package flow, utilizing means for linking rollers together to make a significant reduction in the line pressure.

The present invention is composed of a gravity conveyor consisting of rollers freely rotatable on axles supported on side frames thereby making it easy to support the side frames in any desired angular slope between the package inlet and package outlet ends with the frame. A series of brake modules are mounted alternately from side-to-side of the trackway and are activated in such a way that as one side releases, the other side remains engaged with the rollers. In the preferred embodiment, the brakes on each side are connected operatively together with a cable. The cables are actuated by an air cylinder which is opposed by a spring. Each cable has its own cylinder and spring and they are controlled so that when the left cylinder actuates (releases the brake), the right cylinder remains de-energized (allowing the spring to engage the brake). However, there is a timing sequence when both brake modules are engaged so the packages do not experience a free flow down the slope. Therefore, a single carton being conveyed will index from one brake module to another. The time cycle of the brake operation will therefore control the velocity of the carton.

The present conveyor may employ force applying means for the air cylinders, it may employ energy storing means for the springs, and the brakes may be operatively interlinked in spaced relations so that interlinked brakes will respond as desired to the energy storing means during one operating phase and respond to the force applying means during another operating phase.

DESCRIPTION OF THE DRAWINGS

The subject invention is illustrated in a presently preferred form in the following drawings wherein:

FIG. 1 is a side elevation view of a gravity inclined roller conveyor, with certain portions omitted in order to enable a view of the inlet and outlet ends thereof;

FIG. 2 is a plan view of the gravity roller conveyor of FIG. 1, also having certain portions omitted;

FIG. 3 is a transverse view looking at the low end of the conveyor as seen along line 3—3 in FIG. 2;

FIG. 4 is a transverse view looking at the elevated end of the conveyor as seen along line 4—4 in FIG. 2;

FIG. 5 is a longitudinal section view of a typical brake module assembly associated with a predetermined number of package supporting rollers and revealing certain of the detail of the operating components in the brake assembly, the view being taken along line 5—5 in FIG. 2;

FIG. 6 is a broken longitudinal view in section of the brake module seen in FIG. 2, the view being presented on a larger scale;

FIG. 7 is a transverse view showing the connection of the brake assembly of FIG. 5 attached to an operational cable the view being taken along line 7—7 in FIG. 5;

FIG. 8 is a transverse view of the brake assembly as seen along line 8—8 in FIG. 5;

FIG. 9 is a transverse view taken along line 9-9 in FIG. 5 showing actuating mechanism for the brake assembly seen in FIG. 5;

FIG. 10 is a transverse view taken along line IO-10 in FIG. 5 showing a feature of the brake assembly;

DETAILED DESCRIPTION OF A PREFERRED EMBODIMENT

Figure 11:
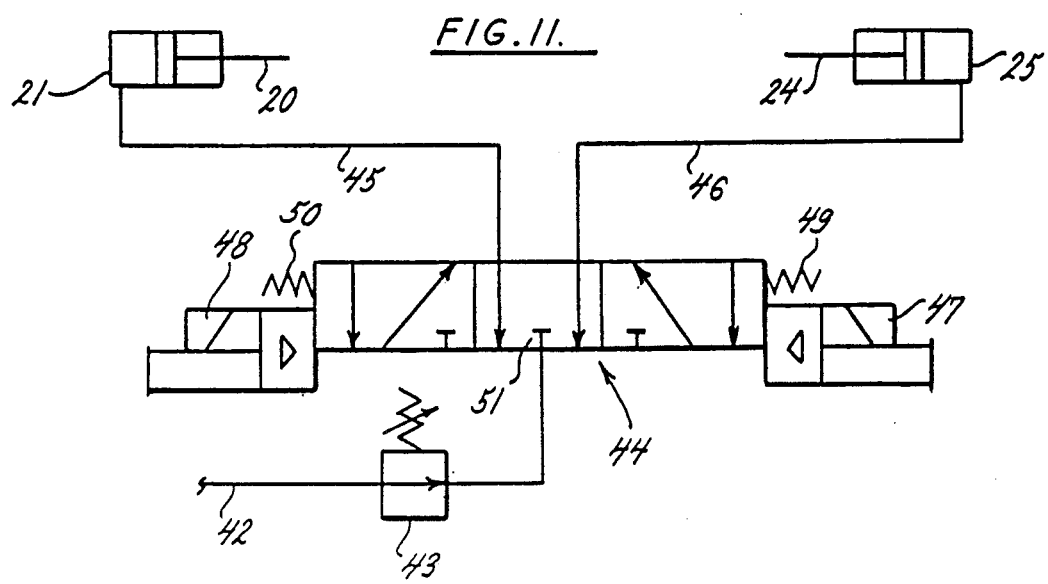
FIG. 11 is a diagram of a control system for cycling the action of the cylinder-spring means to create a regulated passage of packages along the trackway.

FIGS. 1 and 2 are a side and plan view of the controlled flow gravity conveyor respectively. The conveyor has spaced side rails 10 which extend the length of the conveyor from the package high feed end 11 to the low end 12. The intervening length of the side rails is suitably supported on legs 13. FIG. 1 shows the trackway for packages of various sizes and weights depicted generally at P and spaced along the trackway are roller brake modules 15.

The view of FIG. 2 is shown without the rollers so the brake modules 15 and the operating system for these modules can be clearly seen. At the low end of the conveyor there is mounted a pair of coil springs 16 and 17 secured in position by a support 18 extending between the rails 10. The spring 16 is connected to a cable 19 which extends to a connection with the piston rod 20 of a cylinder 21 connected to a suitable support 22. The opposite spring 17 is connected to another cable 23 which extends to a connection with the piston rod 24 of a cylinder 25 which is also connected to the support 22. The side rails 10 are suitably maintained in spaced relation by a series of tubular spacers 26.

The respective cylinders 21 and 25 are connected into a control system which alternately energizes each cylinder to retract the piston rods 20 and 24. When the conveyor is not in use the cylinders 21 and 25 are not energized and consequently, the respective springs 16 and 17 retract and pull the piston rods out to extended positions. As each cylinder is energized, its piston rod retracts and pulls a cable (either cable 19 or 23) to extend the spring and that action operates the brake modules 15 associated with the cable that is pulled. The operating control system is shown in greater detail in FIG. 11.

Turning now to FIGS. 5 to 9 inclusive, there is shown a typical brake module 15 which has a length to be associated with a group of rollers 14 for the purpose of not only braking the rollers from revolving in the direction of flow of packages P but causing the rollers 14 to rotate reversely so as to move the packages backwardly to open a gap between packages P on the reversing rollers and packages that have passed beyond the module 15 in the downward flow along the conveyor.

Each module 15 includes a downwardly open channel 27 (FIGS. 6 and 7) so its flat upper surface is presented toward the rollers 14. A friction applying element 28 of tubular or other suitable form is mounted on the upper surface of the channel 27 so as to be in position to engage the rollers 14. The channel 27 is supported on pairs of skate wheels 29 located near opposite ends of the module 15. Each pair of skate wheels 29 is mounted on a common axle 29A which positions the wheels 29 on the outside of a second downwardly facing channel 30 that encloses a yieldable mounting block 32 under the flat surface 31A that depresses the axle 29A. (FIGS. 5 and 8). The block 32 is fastened at two places to the surface 31A of channel 30 at each side of the location of the axle 29A so the block is able to yield as a load is placed on the skate wheels 29. However, the pairs of skate wheels 29 ride under the channel 27 and allow that channel 27 to move longitudinally relative to the channel 30. The channel 30 (FIG. 5) has its surface 31B extended outwardly beyond the legs of the channel 30, and reinforcing means 31C is positioned on top of the portions 31B to act as stiffeners. One leg of the channel 30 is provided with an attachment bracket 33 (FIG. 7) for supporting the placement of the cable, either cable 19 or 23, depending on which module 15 is being considered. The cable is secured to the bracket 33 by a hook 34 which is drawn down over the cable by tightening up on a nut 35. Thus the module 15 is pulled down toward the exit end of the conveyor rails 10 by the coil springs 16 and 17, and is pulled up against the tension of the springs when the cylinders 21 and 25 are actuated to draw in on the piston rods 23 and 24.

As shown in FIGS. 5 and 6 the reinforced ends of the channel 30 in the area of the stiffeners 31C ride over the adjacent spacer tubes 26 between guide collars 26A to keep the channel 30 moving in a straight line. The under side of the extended surface 31B of channel 30 carries a cam block 36 formed with a sloped cam surface 37 that rides up on the spacer tube 26 when the cable pulls the module assembly 15 to the right as seen in FIG. 5 which is down the slope of the conveyor trackway seen in FIG. 1. As each cam surface 37 rides up on the tubes 26, the channel 27 elevates and presses the friction element 28 upwardly against the limited group of rollers 14 on which a package or several packages P may be present on the way down the trackway. A cable (either 19 or 23) pulls the module 15 down the trackway within the limits permitted by the cylinder piston rod (either 20 or 24) and the friction developed between the element 2B and the roller group will cause those rollers to rotate reversely to move the package or packages upwardly along the trackway to create a gap and thus prevent the weight of the accumulation of packages to crush or damage the lead package or several lead packages.

It can be observed in FIG. 5 and 6 that a cable attached by the hook 35 to the under side of the channel 30 is able under the tension in a spring to move the channel 30 to the right. That movement causes a bumper 40 carried at the end of the extension 31B on channel 30 to engage the channel 27 and move it to the right on the pairs of skate wheels 29. Thus, both channels 27 and 30 move together through the distance determined by the stroke of a piston rod connected to the cable. During the joint motion of the channels 27 and 30, the cam surfaces 37 will ride up on the tubes 26 to elevate the channels 27 and 30 so the friction element 28 will engage the group of rollers 14 and rotate then reversely to cause package P to move back up the slope of the trackway to open a gap with other packages P in the trackway. When the cylinder connected to the cable that operates the brake module just described is energized, the channel 30 carrying the cam 36 is pulled up before the friction element 28 on the channel 27 has released contact with the rollers 14. That relative movement of channel 30 allows the channel bumper 40 to advance up the conveyor ahead of the channel 27. (See the dotted outline in FIG. 6.) Thus, the channel 27 is allowed to drop away from the rollers 14 without causing the rollers 14 to rotate in the direction of flow. The spacing of the end of channel 27 from the bumper 40 is taken up by the light weight springs 41 connected at one end to the flange of channel 27, and the opposite end is connected to the bumper 40 so the springs 41 pull the channel 27 into the bumper 40 so the two channels 27 and 30 resume the position seen in FIG. 5. The motion of the channel 27 and friction element is both down the trackway and vertically up under rollers 14 for a given time, then the movement is reversed so the rollers 14 are not rotated to again allow the packages to be impelled down the trackway. The bumper 40 includes rubber grommets for deadening the metallic sound of the impact on the return movement of the channel 27.

It can be seen in FIG. 2 that there ar two series of brake modules 15 mounted along opposite side rails 10 so as to be on each side of the conveyor trackway. The modules 15 at one side rail are collectively operated in one direction by the tension spring 16 pulling on the cable 19 against the piston rod 20 of cylinder 21. As long as the cylinder 21 is not energized to retract its piston rod 20, the opposing spring 16 will pull the cable 19 downwardly so that the modules 15 are actuated, as above described in a cyclic orbit to elevate the friction elements 28 into contact with the adjacent group of rollers 14 for not only stopping the travel of packages dow the trackway but actually reversing the travel of the packages for a short distance before completing a cyclic orbit without impelling a package down the trackway. In a similar manner spring 17 is connected to a cable 23 and the opposite end of that cable is connected to the piston rod 24 of a cylinder 25. Cable 23 is connected to brake modules 15, and those modules, when the cylinder 25 is not energized, are frictionally engaged with a different set of rollers which will be effective to stop package movement and actually reverse the motion of those packages while moving in the said cyclic orbit.

In order to realize the controlled flow of packages along the sloping gravity conveyor, it is necessary to cyclically energize the cylinders 21 and 25 in a pattern of retracting the piston rods 20 and 24 respectively so that the cables 19 and 23 are alternately pulled against the springs 16 and 17 so as to withdraw the brake modules from the rollers and thereby allow packages to move down the trackway. By cycling the cylinders 21 and 25 in a suitable alternate operation the packages are permitted to flow down the trackway at a controlled speed because of the cycling of the brake modules at different groups of rollers so that packages do not gain sufficient speed to override the brake modules.

The control over the cycling of the cylinders 21 and 25 is regulated so that there is a momentary overlap in the operation of the brake modules on each side of the trackway whereby the brake modules on each side are engaged with the adjacent group of rollers to arrest the movement of all packages along the trackway. The time of overlap may be very short, but is necessary so that the development of a free run of packages down the trackway cannot be reached. It is also evident from the foregoing description relative to the control over the brake modules 15 that an accumulation of packages (accumulation shown at the lower end of FIG. 1) will not be in such mass contact as to impose the accumulating weight of traveling packages on the first 1 or 2 packages that have reached the low end of the trackway.

Turning now to FIG. 11 there is depicted a control circuit for operating the fluid pressure motor means 21 and 25 to cycle the operation of the brake modules 15 so that the packages can be arrested and move against the gravity influence introduced by the slope of the roller trackway. A source of pressure fluid is supplied by conduit 42 through a pressure valve 43 of adjustable character. A double acting valve 44 is connected between the fluid supply conduit 42 and the separate conduit 45 connected to motor means 21, as well as the separate conduit 46 connected to motor means 25. When fluid pressure is admitted to motor means 21 its piston rod 20 is moved to pull on the cable 19, and when the fluid pressure is admitted to motor means 25 its piston rod 24 is moved to pull on cable 23.

The double acting valve 44 is operated by a pair of solenoids 47 and 48 which are periodically energized to shift the valve against the normal centering springs 49 and 50 which hold the valve in neutral with the inlet port 51 closed. A suitable timing circuit may be used to control the cycle. When solenoid 47 is energized the valve 44 is shifted so pressure fluid from supply line 42 is directed into line 45 while the line 46 from cylinder 25 is exhausted to atmosphere. Similarly, when solenoid 48 is energized the valve 44 is shifted so pressure fluid from supply line 42 is directed into line 46 while the line 45 from cylinder 21 is exhausted to atmosphere. Thus the solenoids are never energized at the same time. A program for operating the cylinders 21 and 25 in a cyclic manner calls for each solenoid to be energized for approximately two seconds and deenergized for approximately six seconds, with a two second overlap when neither solenoid 47 nor 48 is energized. At the start up of the conveyor of FIG. 1 it is assumed that solenoid 47 will be energized for the first two seconds while solenoid 48 is deenergized. This is followed for the next two seconds when neither solenoid is energized, and then the next two seconds solenoid 48 is energized while solenoid 47 is deenergized. There then follows two seconds when both solenoids are deenergized, followed by a repeat of the starting cycle. A typical program will be as follows:

| Time | Solenoid 47 | Solenoid 48 |
| --- | --- | --- |
| 0–2 Sec. | energized | deenergized |
| 2–4 Sec. | deenergized | deenergized |
| 4–6 Sec. | deenergized | energized |
| 6–8 Sec. | deenergized | deenergized |
| 8–10 Sec. | energized | deenergized |
| 10–12 Sec. | deenergized | deenergized |
| 12–14 Sec. | deenergized | energized |

In a typical installation for the present gravity type roller conveyor, trackways as long as 100 ft. have demonstrated that the system of cyclically opposing two side by side series of brake modules has substantially eliminated the development of crushing forces on any of the packages moved along the trackway under gravity influence.

Figure 12:
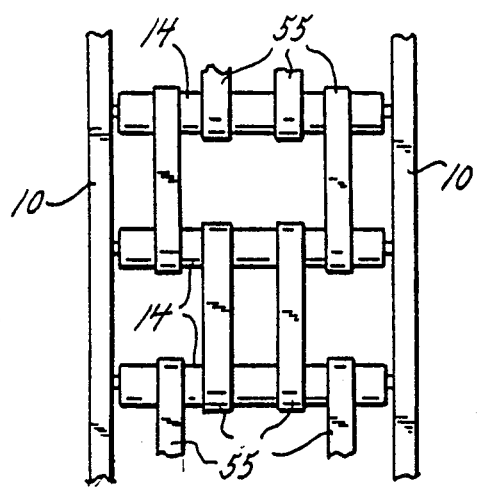
FIG. 12 is a fragmentary view of adjacent package supporting rollers linked by belt-like means.
Figure 13:
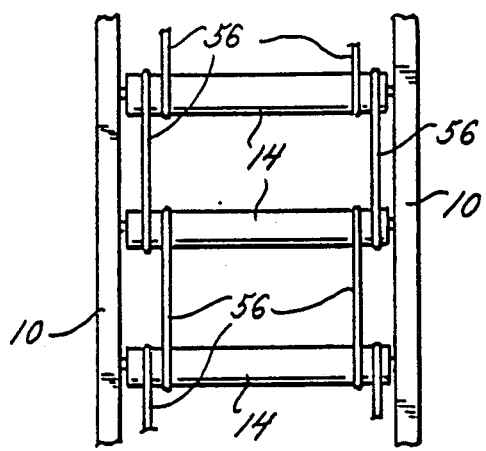
FIG. 13 is a fragmentary view of adjacent package supporting rollers linked by O-ring belts.

In FIG. 12 a fragmentary plan view of adjacent package supporting rollers that have been linked together by belt-like means 55 which are flat so packages move over without difficulty. In FIG. 13 a fragmentary plan view of several rollers is seen linked together by O-ring means 56 moving in grooves in the rollers. In certain instances the rollers themselves may be coated with friction material for better package control when the brake modules are cycled to reverse the rollers as explained above.

The views of FIGS. 1 and 6 depict the use of continuous cables 19 and 23 so that the respective brake module means 15 can be operated in accordance with the program previously described. Since each brake module 15 has a separate device 33 and 34 for contacting the cables, it is contemplated that instead of having a continuous tension cable, the cable can be thought of as being made up of equivalent linking means under tension connected between brake modules so that continuity is established through the brake modules and the intervening link means. While the system seen in FIGS. 1 and 2 is provided with spring means 16 and 17 at the low end of the trackway, and with fluid pressure cylinder means at the high end, it is to be understood that energy storing type means can be used at the low end and force applying means can be employed at the high end to accomplish the desired cyclic operation of the brake modules.

While the foregoing disclosure has been directed to apparatus to control the movement of packages in a gravity flow conveyor, it is recognized that the improvement leads to a method of operating the gravity type roller conveyor by practicing the steps of forming the brake modules in groups so that each group is composed of spaced brake modules, and the modules in each group are in non overlapping arrangement, linking the brake modules in each group in an operating relationship so that energy storing means and force applying means may be related to each group of brake modules, and controlling the application of the energy storing and force applying means to each group of brake modules so that the brake module groups are periodically operated in timed relationship to the energy storing means and force applying means to result in flow retarding motion on packages at different locations on the roller conveyor. In the view of FIG. 1 it can be seen that there are two groups of brake modules which are distributed along the length of the conveyor, and the brake modules in one group are in non-overlapping relation to the brake modules in the other group. By periodically operating the brake modules in the separate groups, packages are retarded from a free flow relationship on the roller conveyor.

It is understood that the present disclosure is not to be unnecessarily restricted or limited, except in so far as prior art may apply.

What is claimed is:

1. A gravity-type roller conveyor for moving packages along a sloped trackway from an inlet end to a discharge end, the roller conveyor comprising;
   (a) spaced apart side rails and a series of rollers operably supported between said side rails to form the trackway for packages moved by gravity; and
   (b) package flow control means in the conveyor for controlling the speed of the movement of packages along the sloped trackway, said control means including:
      (1) a series of brake modules spaced along the length of the trackway and positioned so that each engages different groups of rollers, and
      (2) brake module operating means connected to said brake modules for indexing the operation of said brake modules to cyclicly reverse the direction of turning of said rollers engaged thereby opposite to the direction of package flow along the trackway for preventing free flow package movement.

2. The gravity-type roller conveyor set forth in claim 1 wherein each brake module includes an elongated friction applying element opposite a limited group of said series of rollers, means operably connected to said friction applying element for causing said friction applying element to contact with said group of rollers, and controllable means connected to said operable means for moving it in a direction to turn said group of rollers to move a package opposite to the influence of gravity for creating a gap between the package supported on the group of rollers and other packages.

3. The gravity-type roller conveyor set forth in claim 1 wherein said series of brake modules are arranged in staggered spacing along the trackway.

4. The gravity-type roller conveyor set forth in claim 3 wherein said series of brake modules are operatively interconnected by tension responsive means, and said tension responsive means is connected at one end thereof to energy storing means and at the opposite end to force applying means to override said energy storing means.

5. The gravity-type roller conveyor set forth in claim 1 wherein certain adjacent rollers are linked together by belt-like means.

6. The gravity-type roller conveyor set forth in claim 5 wherein said adjacent rollers linked together by belt-like means are located within said group of rollers for any of said brake modules, whereby conveyor package line pressure is reduced.

7. A gravity-type roller conveyor comprising parallel and laterally spaced side rails for supporting an array of rollers over which packages are to be moved by gravity with the side rails sloped from a package inlet end to a package outlet end to define a package trackway, the gravity type roller conveyor providing a controlled flow of packages between the inlet and outlet ends comprising:
   (a) tension means extending throughout the length of the side rails between the ends of the trackway;
   (b) energy storing means yieldably positioned adjacent the package outlet end;
   (c) force applying means adjacent the package inlet end and connected to the tension means for exerting a force on the energy storing means;
   (d) a series of brake assemblies spaced along the trackway and operably connected to said tension means and carried by and between the side rails in positions to engage beneath the array of rollers over which the packages move by gravity;
   (e) means in each brake assembly operable in a cyclic pattern to effect displacement of a portion of each brake assembly into frictional contact with the adjacent rollers; and
   (f) control means operating said force applying means to periodically cycle the tension means against the energy storing means to cycle the operation of the brake assembly portion into the adjacent rollers for reversing the direction of the rollers to arrest the gravity influence on the package.

8. The gravity-type roller conveyor set forth in claim 7 wherein certain of said array of rollers engaged by said brake assemblies are linked together by friction enhancing belt-like means.

9. In a gravity-type roller conveyor for directing packages along a sloped trackway defined by a series of rollers to support the packages, the improvement comprising:
   (a) an elongated cable system in the trackway having tension spring means at one end of the system and fluid pressure means at the other end of the system, said tension spring means and fluid pressure means pulling the cable system so the cable system is moved alternately by said tension spring means and said fluid pressure means;
   (b) a series of brake modules operably connected to said cable system, each of said brake modules having a first member connected to said cable system for movement in one direction induced by said tension spring means and movement in the opposite direction induced by said fluid pressure means opposing said tension spring means, a second member carried by said first member and movable relative to said first member, said second member being in position to extend along a predetermined group of the rollers, and friction means on said second member in position to engage said group of rollers for moving packages against gravity;
   (c) cam means on said first members in position to engage and move said second member into frictional contact with said group of rollers upon said tension spring means effecting movement thereof in said one direction whereby said group of rollers are rotated in a direction to move a package in the opposite direction against gravity;
   (d) means operably connected between said first and second members to effect movement thereof together in said one direction, and to allow for relative motion between said first and second members upon movement of said first member in said opposite direction; and (e) resilient means connected between said first and second members to effect movement of said second member out of frictional engagement with said rollers in order to trail the movement of said first member in said opposite direction.

10. A method of operating gravity-type roller conveyors for controlling the flow of packages thereon from a high end to a low end of the conveyor, said method including the steps of:
   (a) forming two groups of brake modules with the two groups in laterally spaced and non-overlapping distribution along the roller conveyor;
   (b) linking together the brake modules in each group thereof in operating relationship along the conveyor length between the high and low ends thereof;
   (c) locating the energy storing and force applying means for each of the groups of the brake modules at the low and high ends respectively of the conveyor; and
   (d) controlling the application of the energy storing and force applying means to each group of brake modules, whereby the groups of brake modules are periodically operated between said force applying means and said energy storing means to establish a flow retarding motion on packages received on the conveyor.

11. A method of operating gravity-type roller conveyor for controlling the free flow of packages thereon from a high end to a low end of the conveyor, said method including the steps of:
   (a) providing two groups of brake modules each extending along the length of the roller conveyor between the high and low ends;
   (b) linking the brake modules in each group together for operation of one group independently of the other group.
   (c) applying energy storing means and force applying means from opposite ends of each group of brake modules through the linking of the brake modules in each group; and
   (d) controlling the operation of the energy storing means and force applying means each for selected periods of time, in which the force applying means and the energy storing means have overlapping time periods of short duration and independent periods of time preceding and following said overlapping time periods.

* * * * *